United States Patent [19]

Fladby

[11] 4,231,870
[45] Nov. 4, 1980

[54] PROCESS FOR REGENERATION OF A FILTER MEDIUM

[75] Inventor: Tron-Halvard Fladby, Asker, Norway

[73] Assignee: A/S Akers Mek. Verksted, Oslo, Norway

[21] Appl. No.: 12,738

[22] Filed: Feb. 16, 1979

[30] Foreign Application Priority Data

Feb. 20, 1978 [NO] Norway ............................... 780583
Mar. 6, 1978 [NO] Norway ............................... 780770

[51] Int. Cl.³ .......................................... B01D 23/24
[52] U.S. Cl. .................................. 210/797; 210/792
[58] Field of Search .............................. 210/79–82, 210/59; 134/28

[56] References Cited

U.S. PATENT DOCUMENTS

| 2,069,621 | 2/1937 | Patrick | 210/80 |
| 2,648,440 | 8/1953 | Mullins | 210/80 |
| 2,956,682 | 10/1960 | Stephan | 210/82 |
| 3,385,735 | 5/1968 | Brabrand et al. | 134/28 |
| 3,932,278 | 1/1976 | Meidl et al. | 210/82 |

*Primary Examiner*—Benoît Castel
*Attorney, Agent, or Firm*—Watson, Cole, Grindle & Watson

[57] ABSTRACT

A process for regeneration of a filter medium is provided according to which the filter medium is treated with a liquid which breaks down deposited organic materials on the filter medium. The preferred liquid for regeneration of the filter medium is concentrated sulphuric acid.

2 Claims, 1 Drawing Figure

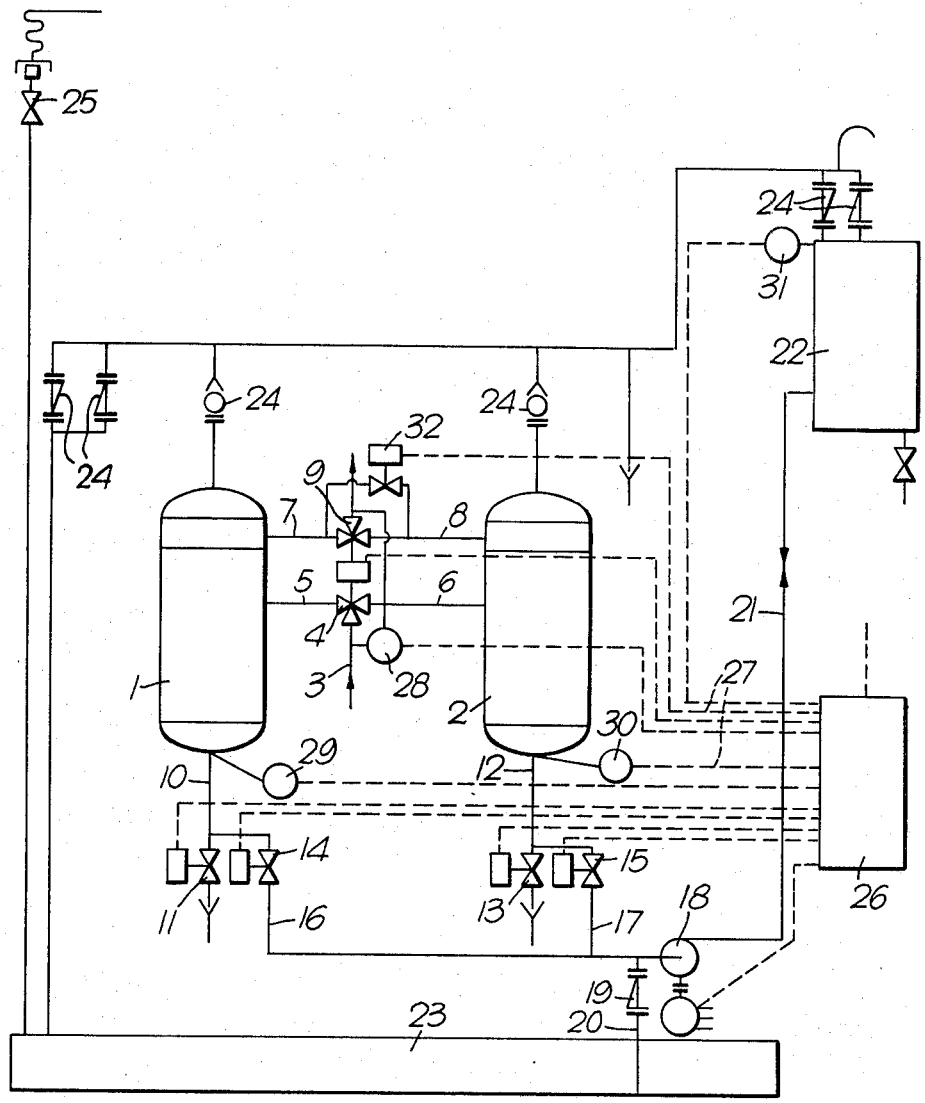

PROCESS FOR REGENERATION OF A FILTER MEDIUM

BACKGROUND OF THE INVENTION

The present invention relates to filtration of liquids such as water, and especially saline or ocean water. More particularly, the invention relates to cleaning and regeneration of filters used for such filtration as well as an apparatus for carrying out the filtration and for regeneration of the used filters.

Injection of water into an oil-bearing structure is today employed partly to increase and partly to maintain the pressure in an oil-producing well. By injecting water into the oil-bearing layer, a better utilization of the oil field can be achieved. The structure into which the water is pumped usually varies from field to field; however, in general such structures can always be characterized as being microporous.

The pores which will be permeated by the water will have a diameter of approximately 10 $\mu$m or less. If the water being forced into the structure contains dispersed particles with a diameter above approximately 10 $\mu$m, the structure will then act as a filter, and the structure will become blocked or clogged after a certain period of time.

Thus it is necessary to remove suspended particles above a certain particle size from the water before the water is introduced into the oil-bearing structure. As injection water can, inter alia, be used seawater, or water from lakes, rivers, and the like. Water from such sources will usually contain relatively large amounts of microorganisms, usually algae, having a size in a range 1-100 $\mu$m. The total amount of organic material, for instance in water taken from the optimal depths in the North Sea, will be in the range 0.1-0.5 ppm. In order that the microorganisms shall not multiply, the water must further be sterilized, for instance by means of chlorination.

The filtration degree will be dependent on the structure into which the water is to be injected; however, in most cases particles above 10 $\mu$m must be removed.

Filtration of water containing marine microorganisms is particularly difficult as such organisms usually form a slime-like and clogging layer on the active surface of the filters, which in a relatively short time results in a complete blocking of the filter.

Conventional re-conditioning methods such as back-washing with water or air is very difficult as relatively high pressures are necessary in order to remove the matter being deposited in and on the very fine-pored material which is utilized for such filtration.

Since back-washing at best is very ineffective and further represents a very high mechanical stress on the filter, the effective life-span of the filter will be relatively short. Consequently, the filter units must be replaced at short intervals, which is very costly both with respect to the costs of the material and in labor.

It is thus an object of the present invention to provide a process for cleaning and regenerating filters used to filter liquids such as water which avoids the noted drawbacks.

SUMMARY OF THE INVENTION

According to the instant process, the regeneration process for such filters includes submitting the filters to a chemical treatment which results in a breakdown or dissolution of the layer of deposited marine biological material thereon.

With regard to the foregoing, algae in general have a high content of proteins and polysaccharides which for instance can be broken down or brought into solution by the use of strongly alkaline agents or by means of suitable enzyme solutions. The material can also be broken down by oxidation by bringing the same into contact with strong oxidizing agents such as chromic acid or alkaline permanganate. However, the preferred treatment agent according to the invention is concentrated sulphuric acid, the concentration of which should be above 65-70%. Such concentrated sulphuric acid will dehydrate the carbohydrates and polysaccharides to elementary carbon and water and further dissolve and break down proteins that are present, resulting in the deposited organic material in substance being removed from the filter material.

From U.S. Pat. No. 2,648,440 a process for cleaning filter sand beds is known wherein the beds are contacted with sodium bisulphite and sulphuric acid which reacts to give sulphurous acid and sodium bisulphate. The object of the process disclosed in this patent is to remove manganese and iron compounds from the filter sand as well as to sterilize the filter. However, from the specification it appears that sulphuric acid is used in an excess of the stoichometric amount of the added sodium bisulphite, and based on the figures given in the specification of this patent, the concentration of the sulphuric acid in contact with the sand bed will be approximately 10%. Such a concentration of sulphuric acid will not be sufficient to dehydrate any carbohydrate material, which is essential in accordance with the instant invention.

In U.S. Pat. No. 3,932,278 a method of cleaning sand or multi-media filters is disclosed which comprises a process for back-washing the filter with water containing a high concentration of chlorine or ozone. Norwegian Pat. No. 137.506 to Shell International Research Maatschappij N.V., relates to a process for dissolution or dispersing of cellular microorganism material deposited within a permeable structure such as an oil-bearing structure or in an oil well by injecting into the permeable structure a solution containing at least one surface-active agent which is effective for dispersing the outer wall layer of the cells of the microorganisms, at least one chelating agent for dispersing the secondary layer of the cells of the microorganisms, and at least one alkali metal hydroxide for promoting the above-mentioned dispersing effects. The injection of the above-mentioned active ingredients can optionally be followed by a further injection of a water-miscible liquid in order to displace the liquid first injected. This Norwegian patent thus relates to the removal of colonies of bacteria which multiply in an oil-bearing structure, for instance colonies of desulphovibrio desulphurcans, this being a sulphate reducing bacteria multiplying in crude oil and water adjacent to such oil.

However, none of the prior art processes are adaptable for the regeneration of the very fine pored filters used for filtration of salt water to be injected into an oil-bearing structure.

A condition in order to work the instant invention is that the filter material be inert with respect to the agent used to remove the biologic material deposited on the filter medium.

As indicated above, concentrated sulphuric acid is the preferred agent because this acid is one of the most commonly used and is already used in large amounts within the petro-chemical field. Suitable filter materials which are resistant to sulphuric acids are homo- or co-polymers of olefins such as ethylene, propylene or butylene, or polymers derived from the corresponding halogenated monomers, for instance polytetrafluoroethylene.

Tests carried out with a filter material of polypropylene have shown that the filter can be fully regenerated by contacting the same with sulphuric acid with a concentration of approximately 96% in 6–10 minutes, whereby the slime-like material deposited on the surface of the filter medium is converted to a black-colored coating which is easily removed by flushing with water. The thus treated filter medium can be regenerated to its original condition. A corresponding filter of a conventional filter material which is regenerated by means of conventional back-washing has an average life-span of 3–4 weeks, whereas in a pilot plant tests have shown that the filters regenerated by means of sulphuric acid will have a useful life of 10–100 times longer. Tests carried out for more than a year with filters of different finenesses, for instance with pores sized in the range of 1.5–8 $\mu$m, have shown that the filters can be repeatedly regenerated and brought back to their original condition without any detectable changes in the physical properties of the filter medium.

The instant regeneration method can easily be adapted to use in an automatic filter process, and according to a further object, a filter system is provided comprising at least two filter units, which units preferably are identical and each is provided with at least one inlet for introduction of unfiltered water and at least one outlet for filtered water. The filter units can be of conventional type, with the only provision that the filter medium be inert with respect to the regeneration medium. When the regeneration medium is concentrated sulphuric acid, the filter medium ought to be of the types previously described and the pipes and other parts of the filter units which are brought in contact with the concentrated sulphuric acid should be made of stainless steel.

Duplex filters are, of course, known within the state of art, and are utilized as an integrally installed portion of a continuously operating liquid line so that one element of the filter operates while the other one is idle. The idle element is then available for cleaning and restoration to its original conditions. When the operating filter becomes substantially clogged, or at a time just prior to clogging, the liquid flow is switched over to the reconditioned filter unit while the clogged idle filter unit is regenerated. Such filter is for instance described in U.S. Pat. No. 2,681,736.

In order to facilitate an automatic control of the new filtering device, each of the filter units is provided with a pressure transducer, or else the filter units are connected to a common pressure transducer, for registration of the pressure drop over the filter medium. When the pressure drop, due to the building up of organic material on the filter medium, reaches a predetermined value, the active filter unit is disconnected while the idle filter unit is connected for filtering of incoming seawater.

In the now idle filter unit to be regenerated, the water is drained off as much as possible in order that the concentrated sulphuric acid to be introduced is diluted only to a minor degree. Thus, after a suitable drainage time, the filter unit is filled with concentrated sulphuric acid in such a way as to cover all the organic material deposited on the surface of the filter medium and the acid is allowed to act on the deposited layer for a predetermined time.

After the predetermined time period, the sulphuric acid is drained off and returned to a storage tank for subsequent use. In order to ensure a constant concentration of the sulphuric acid in the storage tank, make-up acid is supplied from a make-up tank containing concentrated sulphuric acid. The filter medium thus regenerated by means of the sulphuric acid is thoroughly washed to remove adhering sulphuric acid by introduction of purified water from the other filter unit whereafter the regenerated filter unit is ready for a new filtration cycle. Thus, by utilizing two filter units which alternatively are regenerated and alternatively are used in an active filtration cycle, it is possible to obtain a substantially continuous filtration of seawater because one of the filter units always will be in an active filtration phase while the other filter either is under a regeneration phase or is standing by in a regenerated condition and thus ready for a new filter cycle. When the pressure drop over the active filter reaches the predetermined value, a control unit will bring the idle, regenerated filter into an active phase, whereas the clogged filter unit is generated as described above.

For certain purposes where an uninterrupted flow of filtered water is not necessary, it is of course possible to use only one filter unit.

The objects of the invention are attained in the preferred embodiment of the invention described in the accompanying description and illustrated in the accompanying FIGURE.

BRIEF DESCRIPTION OF THE DRAWING

The FIGURE in the accompanying drawing shows a schematic view of a system useful for carrying out the inventive process.

DESCRIPTION OF THE PREFERRED EMBODIMENT

The filter comprises two identical filter kettles 1 and 2 of which one is used for filtration while the other is regenerated. In each of the filter kettles, filter elements of the desired fineness are provided. The water to be filtered is introduced through the pipeline 3. From the valve 4 the water is introduced via the pipes 5 or 6 to either filter kettle 1 or 2. From each of the filter kettles 1 and 2 the filtered water is exhausted through the tubes 7 and 8 and the valve 9. The filter kettles 1 and 2 are drained via the pipes 10 or 12 and the valves 11 and 13. The regeneration liquid, i.e., sulphuric acid, is pumped by means of the pump 18 in and out of the filter kettles 1 and 2 through the valves 14 and 15 and the pipes 16 and 17. The valves are activated by suitable means (remote control). The used regeneration liquid from the filter kettles 1 and 2 is returned to the tank 22 via the tube 21 by means of the pump 18. From the storage tank 23 make-up regeneration liquid is introduced into the system by means of the pump 18 via the check valve 19 and tube 20. The filter kettles 1 and 2 and tanks 22 and 23 are provided with vents 24. In addition, the tank 23 is provided with a device 25 for introduction of new regeneration liquid. The whole procedure is controlled by the control unit 26 via the leads 27.

The functioning of the illustrated device is as follows: when the filter kettle 1 is used for filtration the pressure drop over the filter will gradually increase. When the pressure drop reaches the predetermined value, the pressure transducer 28 will activate the control unit 26. The control unit 26 activates the valves 4 and 9 causing the water to be filtered to pass through filter kettle 2, whereas the filter kettle 1 is disconnected. The water in the filter kettle 1 is exhausted by opening of the valve 11 and the filter kettle is drained for a predetermined time. The valve 11 is closed and the valve 14 is opened. Regeneration liquid is introduced to the filter kettle 1 via the tubes 21, 16, 10 and the filter is maintained in contact with the regeneration liquid for the predetermined time, whereafter the regeneration liquid is returned to the tank 22 via the pump 18. When the filtration kettle is nearly empty, a level sensor 29 closes the valve 14 and the pump 18 will hence withdraw make-up regeneration liquid from the tank 23 via the check valve 19 and introduce the make-up liquid in the tank 22 until the level sensor 31 stops the pump 18. In the filter kettle 2 a level sensor 30 is provided, corresponding to the level sensor 29 in filter kettle 1. Then the valves 11 and 32 are opened and the filter kettle 1 is flushed with filtered water from filter kettle 2 which is active during this stage. After a predetermined flushing time, the valves 11 and 32 are closed in sequence, and the regeneration process of the filter kettle 1 is terminated. When the pressure drop over filter kettle 2 increases and reaches the predetermined level, due to the deposited organic matter, the filter kettle 1 is activated and filter kettle 2 disengaged and regenerated in the same manner as described for filter kettle 1.

The above-described embodiment of the filtration system represents the most simple embodiment by means of which it is possible to obtain continuous filtering of, for instance, seawater. For certain purposes a filter plant can comprise two or more modules of the above-described system, such modules can be coupled in series or in parallel or combination thereof in order to adapt the filter plant for particular purposes.

Further embodiments and variations of the invention will occur to those skilled in the art and still be within the scope and intent of the invention as defined in the appended claims.

I claim:

1. A method of cleaning and regenerating a filter which is used for filtering water but which becomes clogged with a layer of deposited microorganisms such as algae over a period of time, said method including the steps of
   (a) draining away the water to be filtered from both the upstream side and the downstream side of the filter, the upstream and downstream sides relating to the direction of the flow of water to be filtered therethrough,
   (b) directly contacting the filter with a previously formed sulfuric acid solution as the only active treatment chemical, said solution having a concentration of at least 65% sulfuric acid which is sufficient to break down and dehydrate the deposited layer, the acid solution being directed so as to first contact the upstream side of the filter, and
   (c) washing the filter with purified water so as to flush away the residue of the microorganisms, the washing water being directed so as to first contact the upstream side of the filter.

2. The method of claim 1 wherein said filter comprises a solid element having pores therethrough.

* * * * *